(12) United States Patent
Miller et al.

(10) Patent No.: US 7,776,306 B2
(45) Date of Patent: Aug. 17, 2010

(54) LOW ENERGY METHOD OF PREPARING BASIC COPPER CARBONATES

(75) Inventors: Jeff Miller, Hancock, MI (US); Brian Miller, Lake Linden, MI (US); Nader Mazloom, Bay City, MI (US)

(73) Assignee: Peninsula Copper Industries Incorporated, Hubbell, MI (US)

( * ) Notice: Subject to any disclaimer, the term of this patent is extended or adjusted under 35 U.S.C. 154(b) by 0 days.

(21) Appl. No.: 12/466,527

(22) Filed: May 15, 2009

(65) Prior Publication Data

US 2009/0324482 A1    Dec. 31, 2009

Related U.S. Application Data

(63) Continuation of application No. 12/163,560, filed on Jun. 27, 2008, now abandoned.

(51) Int. Cl.
*C01B 31/24* (2006.01)
(52) U.S. Cl. ........................ 423/419.1; 423/352; 423/35
(58) Field of Classification Search ............... 423/23, 423/352, 409, 420.5, 517, 114, 419.1, 35; 252/301.4 F, 301.4 H, 301.4 R, 301.4 P
See application file for complete search history.

(56) References Cited

U.S. PATENT DOCUMENTS

| 2,536,096 | A | 1/1951 | Rowe |
| 2,536,097 | A | 1/1951 | Percy |
| 3,635,668 | A | 1/1972 | Barker |
| 3,971,652 | A | 7/1976 | Bryson |
| 4,490,337 | A | 12/1984 | Richardson |
| 4,944,935 | A | 7/1990 | Langner et al. |
| 6,596,246 | B2 | 7/2003 | Huato et al. |
| 7,411,080 | B2 | 8/2008 | Zhao |
| 2004/0191143 | A1 | 9/2004 | Richardson et al. |
| 2007/0269362 | A1 | 11/2007 | Zhao |

FOREIGN PATENT DOCUMENTS

FR    2 328 661 A1    5/1977

*Primary Examiner*—Stuart Hendrickson
*Assistant Examiner*—Richard M Rump
(74) *Attorney, Agent, or Firm*—Leydig, Voit & Mayer, Ltd.

(57) ABSTRACT

A method of forming basic copper carbonates includes providing an aqueous solution comprising copper (II), ammonia, and carbonic acid; and adding sufficient carbon dioxide to precipitate a basic copper carbonate from the aqueous solution.

26 Claims, 1 Drawing Sheet

LOW ENERGY METHOD OF PREPARING BASIC COPPER CARBONATES

BACKGROUND OF THE INVENTION

Basic copper carbonate (BCC) is a well-known chemical compound which has a variety of uses including, without limitation, as a pigment, insecticide and algaecide. BCC may be represented by the formula $(CuCO_3)_x(Cu(OH)_2)_y$, and may occur as malachite ($Cu_2CO_3(OH)_2$, wherein x and y are 1) or azurite ($Cu_3(CO_3)_2(OH)_2$, wherein x is 2 and y is 1).

Azurite and malachite differ in color, as well as in copper and carbon dioxide content. Azurite, deep blue in color, contains about 55.5% copper and about 25.5% $CO_2$. Malachite, in contrast, is bright green in color, and contains about 57.5% Cu and about 19.9% $CO_2$.

Various methods for the preparation of BCC are known in the art. One traditional method of making BCC may be referred to as "caustic boil." In this method, copper metal is dissolved in an ammonia/ammonium carbonate solution, via well-known techniques developed in the 1800s, followed by boiling off the ammonia to precipitate BCC. The caustic boil method is an energy intensive process and therefore less desirable. Another method contemplates adding sodium carbonate to a solution of copper sulfate, followed by filtering, washing and drying. This method results in BCC contaminated with sodium and sulfate and is therefore less desirable.

A method for preparing BCC which provides advantages over known methods would be desirable.

BRIEF SUMMARY OF THE INVENTION

The present invention meets the foregoing and other needs by providing, in one aspect, the invention provides a method of preparing BCC comprising: (a) providing a solution of copper (II), the solution comprising copper (II), an amine, carbonic acid, and water in a reaction vessel, (b) adjusting the pH of the solution until BCC is formed; and (c) recovering the BCC.

A further aspect of the invention provides, in connection with the method described in the preceding paragraph, the further step of introducing a copper metal-containing material into a copper (II)-depleted solvent system to provide an enriched copper (II) solution, the latter being introduced into the reaction vessel.

In a related aspect, the invention provides a method of preparing BCC comprising: contacting copper metal with an aqueous solution comprising an amine, carbonic acid, and oxygen under conditions where the copper metal is converted into BCC; and recovering the BCC.

DETAILED DESCRIPTION OF THE INVENTION

Figure 1:
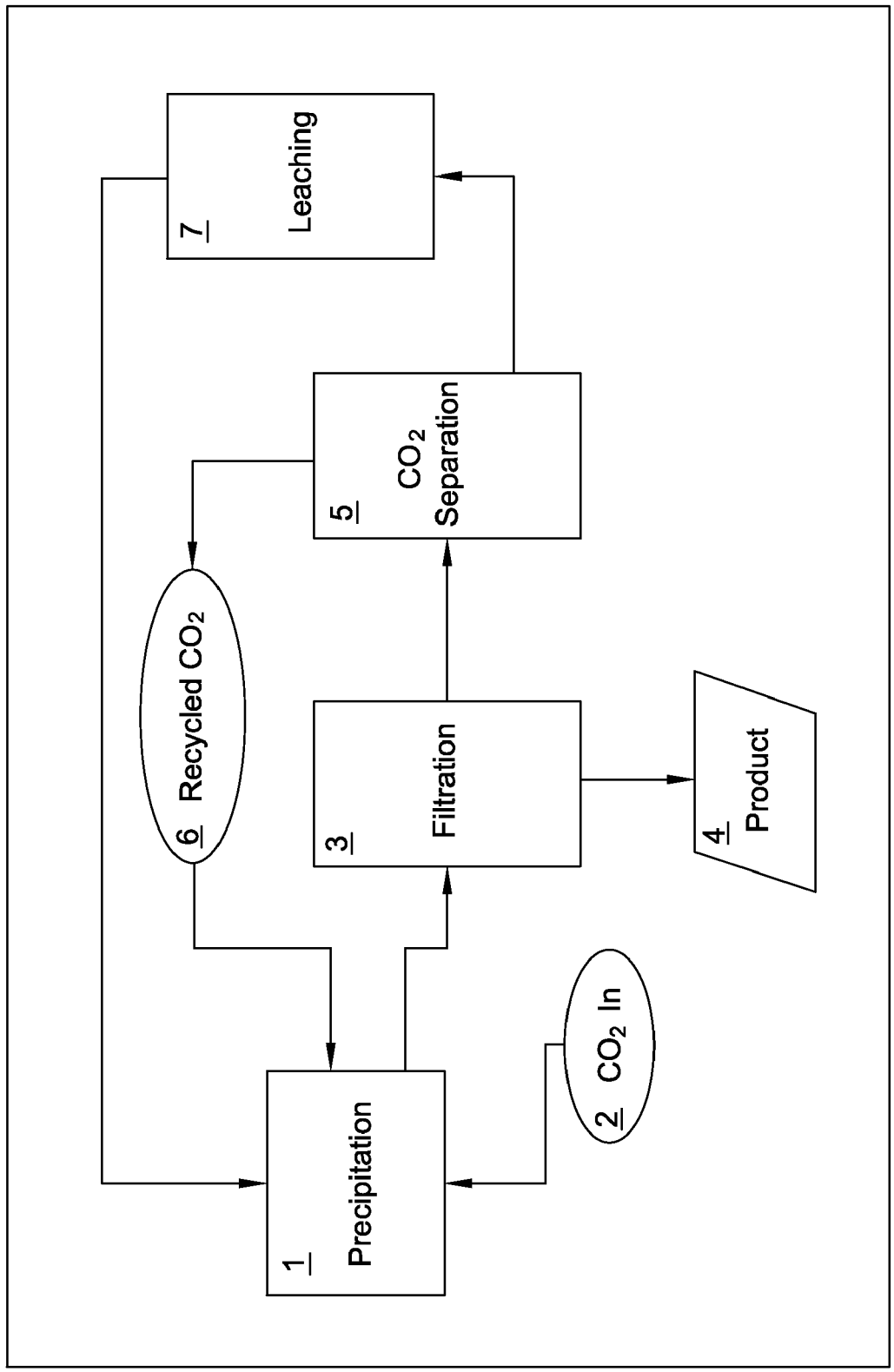
FIG. 1 is a schematic diagram showing an exemplary operational flow of a continuous method of preparing BCC according to one aspect of the present invention.

The various aspects of the present invention provide methods for preparing BCC, the latter being represented by the formula $(CuCO_3)_x(Cu(OH)_2)_y$, wherein x>0 and y>0. Desirably, in this formula, when y is 1, x may be 1 or 2, may range from about 0.95 to less than 1 or to 1, and, more desirably, x is 1 or 2 when y is 1.

More than one species of BCC may be prepared by the inventive methods. For example, malachite ($Cu_2(OH)_2CO_3$, wherein x and y are 1 in the formula) or azurite ($Cu_3(OH)_2(CO_3)_2$, wherein x is 2 and y is 1 in the formula) may be prepared, as may mixtures thereof.

In one aspect, the invention provides a method of preparing BCC comprising: (a) providing a solution of copper (II) in a reaction vessel, the solution comprising copper (II), an amine, carbonic acid, and water, adjusting the pH of the solution until BCC is provided; and recovering the BCC.

The foregoing method may be practiced in any suitable reaction vessel, e.g., a spray chamber, a stirred tank reactor, a rotating tube reactor, or a pipeline reactor, in either a continuous or batch process. It is desirable to practice the method as a continuous process, more desirably using a continuous stirred tank reactor.

The type of reaction vessel may influence the morphology of the BCC formed therein, such as particle size and particle shape. For example, a constantly stirred tank reactor (CSTR) tends to provide fairly uniform spherical agglomerated BCC particles, whereas a rotary evaporator-type reactor, as exemplified in U.S. Pat. No. 4,686,003, produces more rod-like BCC particles. Thus, BCC particle size and shape may be influenced in connection with the inventive method via appropriate reactor vessel selection.

The particle size of BCC may also be controlled by varying the concentrations of copper (II) and ammonia in the solution, as well as by regulating the input rate of copper solution and/or $CO_2$ into the reaction vessel, and/or the endpoint of the precipitation reaction. The particle size may also be controlled by other process parameters, such as residence time or temperature.

In the solution provided in the reaction vessel, or feed solution, the copper (II) included therein may originate from any suitable source.

In practice, a typical copper (II)-containing feed stream contains ammonia, water, carbonic acid, and other components. A typical feed stream will include components, in certain amounts, as follows: copper (II), from about 10 g/L to about 160 g/L, desirably from about 70 g/L to about 105 g/L; water; ammonia, from about 3 g/L to about 110 g/L, desirably from about 50 g/L to about 90 g/L; and ammonia to copper (II) molar ratio from about 2.5 to about 3.3, desirably from about 2.8 to about 3.1; and carbonic acid from about 15 g/L to about 130 g/L, desirably from about 95 g/L to about 110 g/L.

Generally, as the content of the feed stream is known, one skilled in the art should be able to create the feed stream with the amount of each component needed to be present in the reaction vessel to practice the inventive methods.

In the aspect of the invention that involves introducing a copper metal-containing material into a copper (II)-depleted solvent system to provide an enriched copper (II) solution, an additional amount of an amine may be added to assist in solubilizing the copper metal in the aqueous medium. The amine is desirably ammonia (which exists in the aqueous medium in equilibrium with ammonium hydroxide). The amount required to effect this dissolution will vary, but will generally range from about 0.5:1 to about 4:1, and desirably from about 1:1 to about 2:1, moles of amine to moles of copper metal. On an absolute basis, the amount of amine in the aqueous solution is desirably limited, ranging from about 15 g/L to about 105 g/L, and more desirably from about 60 g/L to about 96 g/L, of $NH_3$. In general, as the pressure in the reactor vessel increases, the allowable amine concentration may be increased.

The carbonic acid may be provided in the reaction vessel by any suitable means, but is preferably provided by introducing $CO_2$ into the reaction vessel, e.g., by bubbling $CO_2$ through the aqueous solution, or by providing a relative increase in the partial pressure of $CO_2$ within the reaction vessel. As used herein, the term carbonic acid includes carbonic acid as well as bicarbonate and carbonate ions, as it will be appreciated by one of ordinary skill in reading this disclosure that all of these species may be present when $CO_2$ is introduced into the aqueous solution.

Following precipitation and separation of the solids, it may be necessary to reduce the carbonate level, or increase the pH, in the solution to provide a suitable solution for copper leaching. This can be accomplished by reducing the partial pressure of $CO_2$ in the vessel, or nominally through a reduction of the total pressure within the reaction vessel.

The relationship between the components in the system, while not being bound by theory, may be simplistically explained in terms of an equation: $[Cu^{2+}]^n[OH^-]^m[CO_3^{2-}]^p = K_{sp}$, wherein n, m, and p are greater than 0, and $K_{sp}$ is a solubility product for BCC. When the product of certain ionic concentrations exceed the solubility constant for BCC (i.e., $K_{sp}$) BCC will precipitate out of the solution. Not shown in the $K_{sp}$ equation is the solvating ligand ammonia that influences the concentration of copper ions available for bonding.

In the inventive methods, selectively increasing the concentration of one or more of copper (II), hydroxide ions or carbonate ions, or decreasing the ammonia concentration may be sufficient to cause BCC to precipitate from the solution.

For this invention addition of the $CO_2$ also adjusts the pH of the solution in order to precipitate BCC. In this regard, the pH of the solution is desirably relatively low, for example less than about 10, during the formation of BCC. More desirably, the pH may range from about 7 to about 10, preferably from about 7 to about 9, and more preferably from about 7 to about 8. Preferably, the pH of the solution is adjusted by the introduction and removal of $CO_2$ from the reaction vessel.

One of the advantages of the inventive methods is that BCC may be obtained from copper (II)-containing solutions using less energy relative to known methods. While the methods may be carried out at any suitable temperature, e.g., from about 25° C. to the boiling point of the solution, it is desirable that a limited amount or no heat need be added to the solution during the formation of the BCC. For example, the methods desirably contemplate maintaining the temperature of the solution from about 15° C. to about 100° C. more desirably from about 21° C. to about 82° C., and even more desirably from about 38° C. to about 79° C. Preferably, the temperature of the solution may range from about 60° C. to about 77° C.

The preparation of azurite, malachite or a mixture thereof may be controlled by controlling the temperature of the solution in the reaction vessel. More specifically, azurite is provided in relatively greater quantities when the temperature of the solution is relatively low, while malachite is provided in relatively greater quantities when the temperature of the solution is relatively high. While these temperatures may vary depending on the operating pressure in the reaction vessel, at 100 psig pressure the temperature of the solution to provide azurite is desirably between about 4° C. and about 71° C., and more desirably between about 38° C. and about 68° C.; to provide malachite the temperature is desirably between about 65° C. and about boiling, and more desirably between about 68° C. and about 79° C., and to provide a mixture the temperature of the solution is desirably between about 65° C. and about 71° C., and more desirably between about 65° C. and about 68° C. At relatively lower pressures, the temperature ranges will be relatively lower than those disclosed above.

While the preparation of BCC may be carried while the reaction vessel is at ambient pressure, it may be desirable to increase the pressure in the reaction vessel in order to increase the yield per liter of feed solution. If desired, the pressure in the reaction vessel may desirably range from about 0 psig to about 1500 psig, more desirably range from about 0 psig to about 300 psig, and preferably range from about 50 psig to about 200 psig.

In a related aspect, the inventive methods provide for the preparation of BCC by the introduction of a copper metal-containing material into a solution of copper (II), the solution comprising copper (II), an amine, carbonic acid, and water. Illustrative of suitable copper materials are copper metal, bronze, copper-containing plastics, alloys, compounds, and clads.

The aforesaid copper (II) solution includes a relatively low concentration of copper (II) therein, as it is preferably the solvent system which remains after a copper (II) solution having a relatively high copper (II) concentration has been processed in accordance with the methods described herein to provide BCC.

The copper in the aforementioned copper-containing solution is oxidized prior to introduction into the primary reaction vessel. Oxygen, and more desirably, air, is used as the oxidizer. The conditions under which oxidation will occur are well known to those skilled in the art.

Desirably, and prior to introduction into the reaction vessel, the copper metal-containing material is dissolved in a copper (II)-depleted solvent system comprising an amine to provide a solution which contains a relatively high concentration of copper (II), which is preferably at least 88 g/L, more preferably at least 92 g/L, and most preferably at least 96 g/L copper(II). Desirably, the ammonia concentration ranges from about 60 g/L to about 96 g/L, and the primary reaction vessel is at about 50 psig to about 200 psig, wherein this copper (II) replenished solution is then introduced into the primary reaction vessel wherein BCC is formed.

Desirably, the methods of the invention contemplate that, in the reaction vessel, the molar ratio of ammonia to copper (II) ranges from about 2.6 to about 3.9; the temperature of the solution in the reaction vessel ranges from about 20° C. to near boiling; and the pressure in the reaction vessel ranges from about 0 psig to about 1500 psig. More desirably, in the reaction vessel, the molar ratio of ammonia to copper (II) in the solution ranges from about 2.7 to about 3.8; the temperature of the solution in the reaction vessel ranges from about 48° C. to about 80° C.; and the pressure in the reaction vessel ranges from about 20 psig to about 500 psig. Preferably, in the reaction vessel, the molar ratio of ammonia to copper (II) ranges from about 2.7 to about 3.2; the temperature of the solution in the reaction vessel ranges from about 60° C. to about 75° C.; and the pressure in the reaction vessel ranges from about 80 psig to about 250 psig.

As mentioned previously, an aspect of the inventive methods desirably provides a means for the continuous preparation of BCC. FIG. 1 is a schematic diagram which provides an exemplary operational flow of a method of providing BCC in according with this aspect of the invention. Referring to this figure, the method includes processing stages which may be referred to as precipitation 1, filtration 3, $CO_2$ separation 5, and leaching 7. In the precipitation process, BCC is formed and precipitated from an aqueous solution comprising copper (II), ammonia, and carbonic acid (provided via the introduction of $CO_2$2, as described herein), as described in more detail herein. After BCC formation is completed, the solution may be filtered 3 to recover the BCC 4.

The filtration process contemplated by the invention may be performed by any suitable means, but is desirably performed under pressure (e.g., between about 1 psig and about 1500 psig) to prevent the desorption of $CO_2$, the latter potentially causing solids to re-dissolve in the solvent solution. Further, filtration under pressure (above ambient) may prevent the solids from agglomerating at the bottom of the filter.

After filtration is completed, the copper (II)-depleted solvent desirably may be degassed to remove excess $CO_2$ by boiling for a designated time in a vessel equipped with a condenser (to collect the distillate). Alternatively, or in addition, $CO_2$ may be removed by air stripping or pressure reduction. The $CO_2$ removed by degassing may be reused by recycling 6 it back to the precipitation vessel 1. The copper (II)-depleted solvent may then be used in a leaching/oxidation process 7 to obtain a replenished copper (II) solution, which solution then may be recycled and utilized in the method described herein (to provide BCC). As this method provides for continuous processing in a closed loop, waste production is minimized and lower energy consumption is achieved.

The exemplary continuous processing illustrated in FIG. 1 is provided as one possible embodiment of the inventive method, and may be modified as desired. For example, the replenished copper (II) solution may be diluted with water prior to its use in the method in order to restore an appropriate solution concentration. Also, after BCC is formed, and prior to filtration, the resultant slurry may be subjected to a thickening process. Additionally, after the copper metal is added to the copper (II)-depleted solvent system (after the leaching process), the resulting aqueous solution may be oxidized to obtain a solution having a relatively higher amount of copper (II) (for example, higher than 1 g/L) and a lower amount of copper (I) (for example, lower than 1 g/L). The solution may also be heated after this oxidizing process to control the temperature of the solution as desired, which would permit some control over the type of BCC formed using the method, as described herein. This temperature control also may be implemented after oxidation, or at a different processing juncture, e.g., prior to and/or during the precipitation process.

The inventive method also contemplates preparing BCC by contacting copper metal with an aqueous solution comprising an amine, carbonic acid (which may be present as a carbonate, as described herein), and oxygen under conditions where the copper metal is converted into BCC; and recovering the BCC.

The invention further contemplates a method of forming BCC comprising the steps of providing copper (II) hydroxide in an aqueous solution comprising an amine and a sufficient amount of carbonic acid to convert at least one fourth of the copper hydroxide to BCC; under conditions where the copper hydroxide is converted to BCC; and recovering the BCC. In this aspect of the invention, the amine is desirably ammonium hydroxide, and the copper hydroxide is desirably formed by contacting copper metal with an oxidant and an aqueous solution comprising ammonium hydroxide under conditions that the copper metal is converted to copper (II) hydroxide. Those skilled in the art will appreciate that copper (II) hydroxide may be formed when the solution has a high concentration of hydroxide ions relative to carbonate ions, and that the copper (II) hydroxide is disassociated in the presence of water, providing copper (II) ions in the aqueous solution. Desirably, the solution may contain from about 0.1 gram to 15 grams of soluble copper ions per liter of soluble copper.

The following examples further illustrate the invention but, of course, should not be construed as in any way limiting its scope.

EXAMPLE 1

This example demonstrates production of BCC by reducing the pH of a plant solution left from caustic boil production of BCC and containing copper (II), ammonia and $CO_2$.

3 L of an aqueous solution containing 48 g/L $CO_2$, 48 g/L $NH_3$, 54 g/L copper (II), and at a pH of 10 were added to a stoppered Erlenmeyer flask whose side-arm was open to the atmosphere; the stopper held a gas dispersion tube connected to a source of $CO_2$ gas, and a thermometer. The starting temperature was 22.9° C. $CO_2$ gas was bubbled into the solution at a rate of 0.5 LPM, with constant mixing. At 1.5 hours, the pH was 8.07 and the temperature had risen to 31.1° C.; solids started to form. After 3.5 hours, 10 g of blue solids were collected by filtration. The remaining solution had a pH of 7.7 and a temperature of 29.7 ° C., and contained 94 g/L $CO_2$, 47 g/L $NH_3$, and 49 g/L Copper (II). The collected solids constituted 53.84% copper determined by electrogravimetry, 24.38% $CO_2$ determined by differential pressure, and 0.68% $NH_3$ determined by the Kjeldhal method.

This example illustrates the preparation of BCC from a copper (II) solution by lowering the pH, and without additional energy input (e.g., the solution was not heated after introduction into the reaction flask).

EXAMPLE 2

This example demonstrates leaching of copper metal into an aqueous solution containing copper (II), ammonia and $CO_2$.

After the filtration of BCC therefrom, the resultant copper (II)-depleted solution was boiled to remove excess $CO_2$. After boiling, the aqueous solution contained 16.4 g/L copper (II), 18.9 g/L $NH_3$, and 25.6 g/L $CO_2$, and had a pH of 8.3. 1.0468 kg of 78% copper-on-steel wire was added to 9.0 L of the boiled solution in a 10 L cylindrical glass reactor with a peristaltic feed pump. At time zero, the solution had a temperature of 28° C., which was brought to and maintained at 38-40° C. during the leaching. Air was sparged through system. At the end of 8.0 hours, the solution contained 22.8 g/L copper (II), 20 g/L $NH_3$, 24.3 g/L $CO_2$, and had a pH of 8.15. The boiled solution was enriched by the leaching of 6.4 g/L copper (II) from copper metal.

This copper-enriched solution is suitable as the feed solution for use in the BCC preparation process described herein.

EXAMPLE 3

This experiment demonstrates that BCC may be precipitated from a copper-depleted solution that had been enriched by dissolving copper metal.

10 L of enriched solution from a leaching test was put into a stirred tank reactor. The initial conditions of the aqueous solution were: 21.7 g/L copper (II), 17.7 g/L $NH_3$, 30.1 g/L $CO_2$, pH 9.0, and temperature 24° C. The $CO_2$ flow rate was set to 2.0 LPM. After 1 hour, the pH had dropped to 7.46, the temperature was 46° C. and solids had started to form. After 3 hours, 156.7 g of dark green solids were collected by filtration. The final solution had 11.1 g/L copper (II), 18.2 g/L $NH_3$, 37.8 g/L $CO_2$, a pH of 7.6 and a temperature of 43° C. The dried solids were 56.7% copper. Thus, a process loop was achieved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A continuous method of preparing basic copper carbonate comprising:
    (a) providing an aqueous solution of copper (II), the aqueous solution comprising copper (II), an amine, carbonic acid, and water in a reaction vessel;
    (b) adjusting the pH of the solution until basic copper carbonate is formed;
    (c) recovering the basic copper carbonate from the aqueous solution by subjecting the aqueous solution to filtration;
    (d) transferring the aqueous solution which remains after the recovery of basic copper carbonate in step (c) into a second vessel;
    (e) removing carbon dioxide from the aqueous solution which remains after the recovery of basic copper carbonate in step (c);
    (f) introducing a copper metal-containing material into the aqueous solution which remains after the removal of carbon dioxide in step (e);
    (g) oxidizing the copper metal-containing material to provide a replenished copper (II) solution; and
    (h) introducing the replenished copper (II) solution into the reaction vessel.

2. The continuous method of claim 1, wherein the temperature of the solution ranges from about 20° C. to about 100° C.

3. The continuous method of claim 1, wherein the temperature of the solution is from about 25° C. to about 80° C.

4. The continuous method of claim 1, wherein reaction vessel is a spray chamber, a stirred tank reactor, a rotating tube reactor, or a pipeline reactor.

5. The continuous method of claim 1, wherein the pH is adjusted by increasing or decreasing the $CO_2$ concentration.

6. The continuous method according to claim 1, wherein step (b) is carried out at ambient pressure, 7. The continuous method of claim 1, wherein the pressure in the reaction vessel during step (b) ranges from about 0 psig to about 1500 psig.

8. The continuous method of claim 7, wherein the pressure in the reaction vessel during step (b) ranges from about 20 psig to about 500 psig.

9. The continuous method of claim 8, wherein the pressure in the reaction vessel during step (b) ranges from about 80 psig to about 250 psig.

10. The continuous method of claim 1, wherein the copper metal-containing material is bronze, copper alloys, copper clads, or copper compounds.

11. The continuous method according to claim 1, wherein during step (b) the molar ratio of ammonia to copper (II) in the reaction vessel ranges from about 2.7 to about 3.8; the temperature of the solution in the reaction vessel ranges from about 48° C. to about 80° C.; and the pressure in the reaction vessel ranges from about 20 psig to about 500 psig.

12. The continuous method according to claim 1, wherein during step (b) the molar ratio of ammonia to copper (II) in the reaction vessel ranges from about 2.7 to about 3.2; the temperature of the solution in the reaction vessel ranges from about 60° C. to about 75° C.; and the pressure in the reaction vessel ranges from about 80 psig to about 250 psig.

13. The continuous method of claim 12, wherein the copper metal-containing material is bronze, copper alloys, copper clads, or copper compounds.

14. The continuous method according to claim 1, wherein the basic copper carbonate is selected from the group consisting of azurite, malachite and mixtures thereof 15. The continuous method according to claim 3, wherein the basic copper carbonate is selected from the group consisting of azurite, malachite and mixtures thereof 16. The continuous method according to claim 1, wherein the basic copper carbonate is azurite.

17. The continuous method according to claim 2, wherein the basic copper carbonate is azurite.

18. The continuous method according to claim 3, wherein the basic copper carbonate is azurite.

19. The continuous method according to claim 6, wherein the basic copper carbonate is azurite.

20. The continuous method according to claim 7, wherein the basic copper carbonate is azurite.

21. The continuous method according to claim 8, wherein the basic copper carbonate is azurite.

22. The continuous method according to claim 11, wherein the basic copper carbonate is azurite, 23. The method according to claim 1, further comprising the step of introducing carbon dioxide removed in step (e) into the reaction vessel.

24. The method according to claim 1, wherein transfer step (d) occurs prior to the removal of carbon dioxide step (e).

25. The continuous method of claim 1, wherein the amine is ammonium hydroxide.

26. The continuous method of claim 1, wherein the basic copper carbonate is one selected from the group consisting of azurite, malachite, and mixtures thereof.

* * * * *

UNITED STATES PATENT AND TRADEMARK OFFICE
CERTIFICATE OF CORRECTION

| | | |
|---|---|---|
| PATENT NO. | : 7,776,306 B2 | Page 1 of 1 |
| APPLICATION NO. | : 12/466527 | |
| DATED | : August 17, 2010 | |
| INVENTOR(S) | : Miller et al. | |

It is certified that error appears in the above-identified patent and that said Letters Patent is hereby corrected as shown below:

Title page, item (63), "Continuation of application No. 12/163,560, filed on Jun. 27, 2008, now abandoned" -- should read -- Division of Application No. 12/163,560, filed on Jun. 27, 2008, now abandoned --

Signed and Sealed this

Ninth Day of November, 2010

David J. Kappos
*Director of the United States Patent and Trademark Office*